(12) United States Patent
McDonald et al.

(10) Patent No.: US 12,135,423 B2
(45) Date of Patent: Nov. 5, 2024

(54) HEAD-UP DISPLAY WITH DISCRETE AND CONTROLLED MOVEMENT OF SCREEN

(71) Applicant: Valeo North America, Inc., Troy, MI (US)

(72) Inventors: Terrance McDonald, Troy, MI (US); Pierre Mermillod, Troy, MI (US)

(73) Assignee: VALEO COMFORT AND DRIVING ASSISTANCE (FR)

( * ) Notice: Subject to any disclaimer, the term of this patent is extended or adjusted under 35 U.S.C. 154(b) by 4 days.

(21) Appl. No.: 18/103,097

(22) Filed: Jan. 30, 2023

(65) Prior Publication Data
US 2024/0255755 A1    Aug. 1, 2024

(51) Int. Cl.
G02B 3/00     (2006.01)
G02B 26/02    (2006.01)
G02B 27/01    (2006.01)

(52) U.S. Cl.
CPC ................. *G02B 27/0101* (2013.01)

(58) Field of Classification Search
CPC ................................ G02B 27/0101
See application file for complete search history.

(56) References Cited

U.S. PATENT DOCUMENTS

| | | |
|---|---|---|
| 6,078,038 A | 6/2000 | Cooper |
| 7,030,894 B2 | 4/2006 | Allen et al. |
| 7,034,811 B2 | 4/2006 | Allen |
| 9,001,402 B2 | 4/2015 | Rumreich |
| 9,134,536 B2 | 9/2015 | Sekiya et al. |
| 10,031,336 B2 | 7/2018 | Uragami et al. |
| 10,401,631 B2 | 9/2019 | Ukai et al. |
| 11,194,170 B2 | 12/2021 | Bobryshev et al. |
| 2004/0027363 A1* | 2/2004 | Allen ............ G09G 3/007 345/698 |
| 2015/0219803 A1* | 8/2015 | Inamoto ......... G02B 27/0101 359/627 |
| 2015/0260984 A1* | 9/2015 | Yamakawa ........ H04N 9/3182 345/591 |
| 2017/0212347 A1* | 7/2017 | Uragami ........ G02B 27/0149 |
| 2017/0351090 A1 | 12/2017 | Sekiya et al. |
| 2021/0110749 A1* | 4/2021 | Hada ............ H04N 9/3155 |
| 2023/0221614 A1* | 7/2023 | Narabu ............ G02B 26/08 349/33 |

FOREIGN PATENT DOCUMENTS

| | | |
|---|---|---|
| JP | 2020024298 A | 2/2020 |
| WO | 2021191648 A1 | 9/2021 |

OTHER PUBLICATIONS

International Search Report and Written Opinion for PCT Application No. PCT/US2024/012781, dated May 14, 2024, 11 pages.

* cited by examiner

*Primary Examiner* — Kwang-Su Yang
(74) *Attorney, Agent, or Firm* — Dickinson Wright PLLC

(57) ABSTRACT

A head-up display includes a laser light source configured to generate a laser light. A mirror is configured to rotate about an axis to scan the laser light onto a screen. In embodiments, the screen is a microlens array that has a plurality of lenses that receive and transmit the scanned laser light. The screen extends within a plane that is perpendicular to the direction of the light received from the mirror. At least one processor is programmed to shift the screen a discrete distance and in a discrete direction along the plane. In embodiments, the discrete distance is a function of a size of the lenses in the microlens array.

15 Claims, 5 Drawing Sheets

HEAD-UP DISPLAY WITH DISCRETE AND CONTROLLED MOVEMENT OF SCREEN

TECHNICAL FIELD

The present disclosure relates to a head-up display with discrete, controlled movement of a screen.

BACKGROUND

In recent years, image display devices known as head-up displays (HUDs) have been developed and implemented in various settings. One particular implementation is in an automotive vehicle. Here, light is modulated to project information toward the vehicle windshield, and the driver's eyes are irradiated with reflected light from the windshield. Consequently, a vehicle driver can see a virtual image of an image ahead of the windshield. For example, a vehicle speed, outdoor temperature or the like can be displayed as a virtual image that appears to be ahead of the vehicle windshield. This allows the driver to maintain focus on the road ahead while also being able to view important information generated by the HUD.

SUMMARY

In one embodiment, a head-up display is configured to allow an observer to visually recognize a virtual image. The head-up display comprises a laser light source configured to generate a laser light, a mirror configured to rotate about an axis and scan the laser light, and a microlens array that receives the scanned laser light. The microlens array has a plurality of lenses extending along a plane, each lens having a width extending along a horizontal direction of the plane and a height extending along a vertical direction of the plane. The head-up display also comprises at least one processor programmed to shift the microlens array a discrete distance and in a discrete direction along the plane.

In another embodiment, a method of generating a virtual image via a head-up display includes the following: (a) positioning a microlens array at a first discrete location; (b) generating video data by activating a laser light source to generate a laser light with the microlens array located in the first discrete location; (c) terminating the video data by deactivating the laser light source with the microlens array located in the first discrete location; (d) shifting the microlens array from the first discrete location to a second discrete location after (c) and while the video data is terminated; € generating the video data by reactivating the laser light source with the microlens array located in the second discrete location; (f) terminating the video data by deactivating the laser light source with the microlens array located in the second discrete location; and (g) shifting the microlens array from the second discrete location to the first discrete location after (f) and while the video data is terminated.

In another embodiment, a head-up display is configured to allow an observer to visually recognize a virtual image. The head-up display comprises a light source configured to selectively generate light, and a microlens array that receives the light. The microlens array has a plurality of lenses extending along a plane, each lens having a width extending along a horizontal direction of the plane and a height extending along a vertical direction of the plane. The head-up display further comprises at least one processor programmed to shift the microlens array back and forth within the plane between a first discrete location and a second discrete location, wherein the first discrete location and the second discrete location are separated by (a) a horizontal shift distance less than or equal to one half of the width, and (b) a vertical shift distance less than or equal to one half of the height.

DETAILED DESCRIPTION

Figure 1:
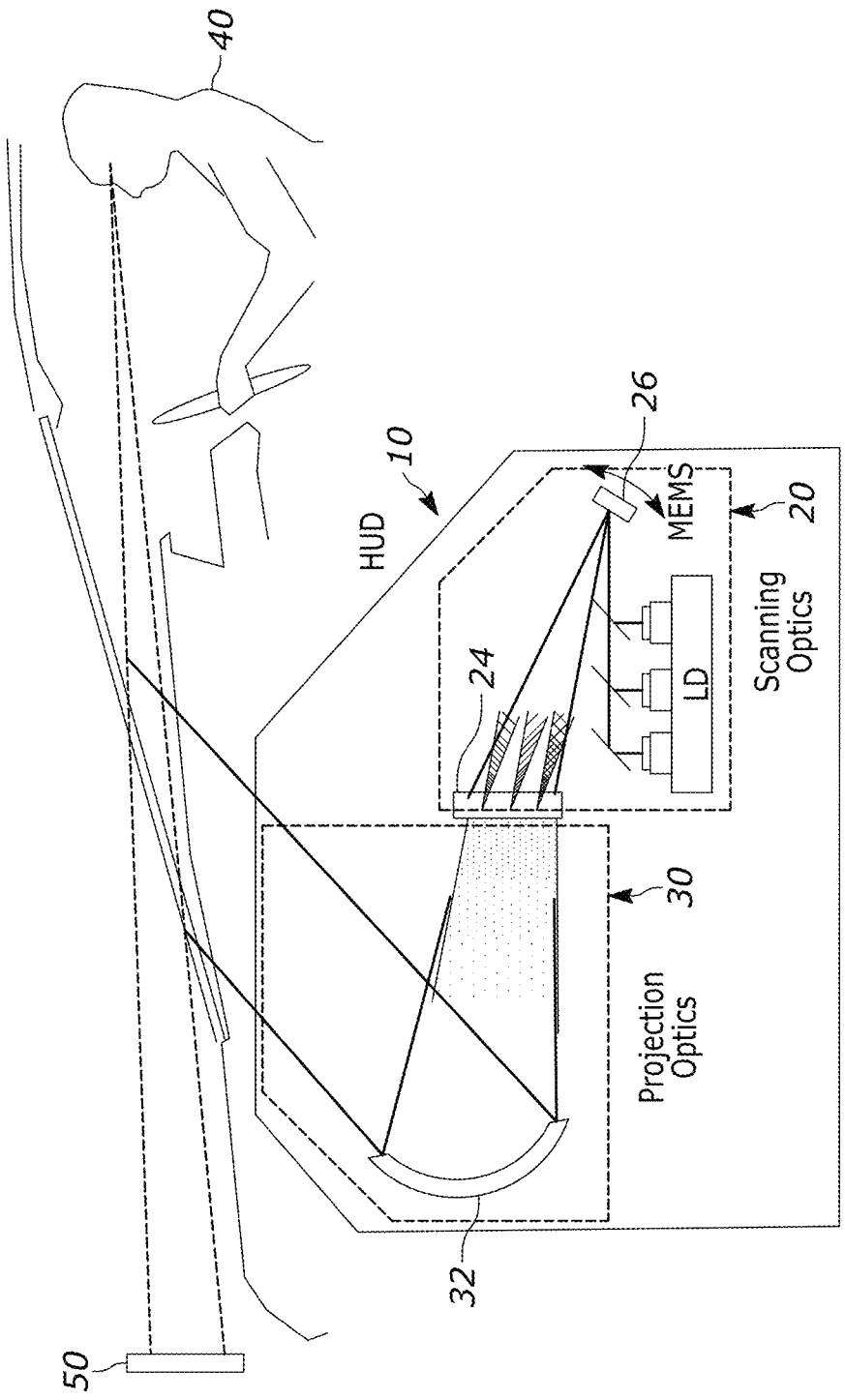
FIG. 1 is a schematic of a head-up display (HUD) in a vehicle with a configuration according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Automobiles are equipped with many functional devices for providing drivers with various types of information. Common devices that provide visual information to drivers include car navigation systems, meter displays, infotainment systems, and the like. In recent years, head-up displays (HUDs) provide an alternative or supplemental form of providing visual information. HUDs provide a form of augmented reality (AR) that displays information to a viewer superimposed onto a real-world view. In vehicular settings, HUDs can be used to generate a virtual image that appears, from the perspective of the driver, as part of the real-world view. The type of information provided to the driver via the HUD can include vehicle speed, navigation guidance, warnings to the driver, and other types of information. By providing this type of information in the form of a generated virtual image, driver awareness is improved because the driver no longer has to look away from the roadway to obtain this information; the driver can remain focused on the road ahead.

One type of HUD is a liquid crystal display (LCD) HUD. In this type of HUD, a transmissive display technology is employed and LED backlights illuminate the entire image when light passes through it. The image is first loaded into the LCD and is then illuminated by high power LEDs. The illuminated image is magnified, reflected off a fold mirror and reflected off of the windshield into the driver's field of view. An LCD HUD can have a limited field of view, and the LCD panel may have limited resolution, which makes it harder to provide more information for the driver to see. Another type of HUD is a digital light processing (DLP) HUD. DLP HUDs can result in better resolution compared to LCD HUDs because a DLP HUD has thousands of micromirrors in an array, and each mirror servicing as a pixel and modulated to reflect the incident light to create the desired pixel intensity. Other types of HUDs include reflective liquid crystal on silicon (LCOS), reflective digital micromirror device (DMD-DLP), and others.

One other particular type of HUD is a laser-based HUD, also called a laser scanning HUD. In this type of HUD, a laser light source(s) is utilized to generate the virtual image, wherein each pixel is pulsed very rapidly to create the full image resolution. A laser scanning HUD may be optimal because it has lower thermal heat generation, it can produce darker (or more true) black colors, and refocusing optics can be omitted from the system because the laser beam is always in focus. However, laser-based HUDs can oftentimes create a perceived lack of clear resolution in the generated virtual image; the generated virtual image may appear to be pixelated due to laser-oriented speckles and Moiré.

According to various embodiments herein, a screen (e.g., microlens array) is shifted, vibrated, oscillated, or otherwise moved back and forth to correct and improve the perceived resolution of the generated virtual image. The resolution is perceived to be better to the viewer by moving the screen back and forth in a controlled, discrete manner. This can be useful in laser-based HUDs, for example. In embodiments, the light source (e.g., laser) generates light at an on/off frequency higher than human perception (e.g., 50 Hz or higher), and the screen is shifted from one discrete location to another discrete location at the moments when the light source is not generating light. This allows the screen to assume two different positions when the light source is actively generating light (while moving between the two different positions when the light source is not actively generating light), thus doubling the perceived resolution of the generated virtual image.

FIG. 1 shows a general configuration of a laser-based head-up display (HUD) system 10, according to an embodiment. The laser-based HUD system 10 generally includes two optical systems—a scanning optics system 20 and a projection optical system 30. In the scanning optics system 20, RGB lasers are generated from three laser light sources, shown generally at 22. The laser light sources may include a red-channel based on a red laser source, a green-channel based on a green laser source, and a blue-channel based on a blue laser source, for example. The RGB lasers are scanned onto a screen 24 by a rotatable mirror 26 to create an image. The mirror 26 may be a microelectromechanical system (MEMS) mirror, for example. The light produced by the RGB lasers, as well as the rotation of the mirror 26, may be controlled by appropriate controllers based on an image signal, depending on the information desired to be displayed.

In the projection optical system 30, the HUD projects a virtual image onto the front windshield 31 by using a concave mirror 32. Additional mirrors or other optical components may be provided in the projection optical system 30 as needed. A driver 40 looking through the front windshield 31 see a virtual image 50 appear on the windshield with a focal point ahead of the windshield.

Figure 2:
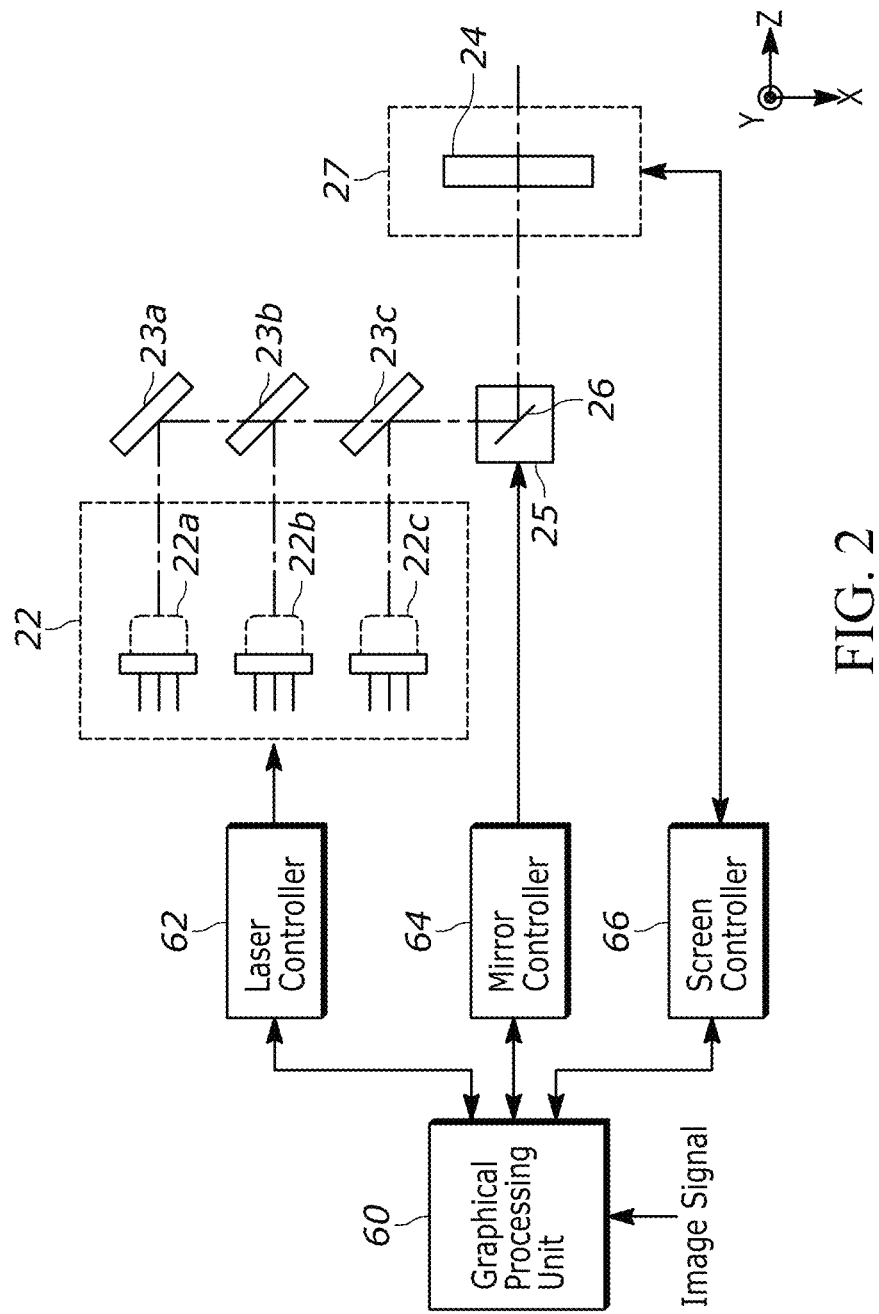
FIG. 2 is a schematic of a scanning optics subsystem of the head-up display of FIG. 1, according to an embodiment in which a light source, a mirror, and a screen are controlled.

FIG. 2 is a schematic of a scanning optics system 20 of the HUD 10 of FIG. 1, according to an embodiment. The illustrated embodiment is but one embodiment of a type of scanning optics system for a laser-based HUD, and of course additional or alternative structure may be provided in other embodiments of the system that is not illustrated. In the illustrated embodiment, the laser light source 22 includes three laser light sources 22a to 22c. Laser light source 22a emits laser light of a red color wavelength range, laser light source 22b emits laser light of a green color wavelength range, and laser light source 22c emits a laser light of a blue color wavelength range, for example. The laser light sources 22a to 22c collectively display a color image as virtual image 50. When an image of a single color is displayed as image 50, light source 22 may include only one laser light source corresponding to the color of the image. Laser light sources 22a to 22c each include a semiconductor laser, for example.

Although not shown in FIG. 2, collimator lenses may also be included in the scanning optics system 20. For example, three individual collimator lenses may be provided, each lens corresponding to a respective laser light source 22a to 22c. Each lens can assure or convert the laser light emitted from the laser light sources 22a to 22c into substantially parallel light.

The laser light of the respective colors emitted from the laser light sources 22a to 22c is reflected by mirrors 23a to 22c. For example, mirror 23a reflects the red laser light that is generated from the red laser light source 22a, mirror 23b reflects the green laser light that is generated from the green laser light source 22b, and mirror 23c reflects the blue laser light that is generated from the blue laser light source 22c. Mirrors 23b and 23c may be dichroic mirrors such that mirror 22b transmits the red laser light reflected off of mirror 23a, and mirror 22c transmits both the red and green laser light while reflecting the blue laser light. Mirrors 23a to 23c are disposed so as to match the optical axes of the laser light of respective colors emitted from laser light sources 22a to 22c.

The scanning optics system 20 also includes scanner 25. The scanner 25 is configured to reflect the laser light of each color reflected off mirrors 23a to 23c. The scanner 25 includes mirror 26 described with reference to FIG. 1. The mirror 26 may include or be referred to as a MEMS mirror. The scanner 25 is configured to rotate the mirror 26 about an axis perpendicular to the direction of the light reflected from the mirrors 23a to 23c. For example, given the X-Y-Z directions illustrated in FIG. 2, the mirror 26 rotates about a Y-axis. This directs and scans the laser light of each color to the screen 24.

In one embodiment, the screen 24 is a microlens array. The microlens array can include a grid of several lenses laid out in a two-dimensional array on a supporting substrate. Each microlens may be a single lens element with one plane surface and one spherical convex surface to refract the light. Each lens can be generally (although not exactly, when evaluated under a microscope) uniform in size and shape (e.g., outer transverse shape being square, rectangular, circular, etc.). In one embodiment, each lens is semi-spherical. The diameter of each lens can be less than a millimeter (mm), and can be in the range of 1 to 100 micrometers (μm). References to "diameter" are intended to be the distance between two points along a common line that passes through the center of the lens, regardless of shape. For example, references to a "diameter" of the lens can be to a circular-shaped lens, but can also be to a rectangular-shaped lens, square-shaped lens, etc. With the screen 24 being a microlens array, it is possible to control an orientation distribution of the light which is transmitted through the screen 24, and thus it is possible to increase the intensity of light which reaches the eyes of the driver, and to reduce light which does not reach the eyes of the driver, allowing for improvement of the luminance of the image.

One potential issue with a microlens array in a HUD can be that the generated virtual image may appear to be pixelated, as described above. This can be referred to as pixelization. With light transmitting through each individual lens of the microlens array, a pixelated appearance can be present in the image, which can be undesirable to the driver. Therefore, according to various embodiments disclosed herein, the screen 24 (e.g., microlens array) is shifted, vibrated, oscillated, or otherwise moved back and forth to correct and improve the perceived resolution of the generated virtual image. The resolution is perceived to be better to the driver by moving the screen back and forth in a controlled, discrete manner within a plane transverse to the direction of light travel.

To control the movement of the screen and other structure within the scanning optics system 20, various controllers are provided. For example, the scanning optics system 20 can include a graphical processing unit (GPU) 60, a laser controller 62, a mirror controller 64, and a screen controller 66. In the illustrated embodiment, each of these controllers is a separate designated controller each having its own processor and memory, but in other examples the functions performed by the illustrated controllers can be performed by one or more processors and associated memory.

In general, the GPU 60 includes a processing unit such as a central processing unit (CPU) and associated memory. The GPU 60 is configured to process an input image signal to control the laser controller 62, mirror controller 64, and screen controller 66 to generate the virtual image 50. The image signal may be provided from another system and includes signals that indicate a desire to display certain vehicle information in the virtual image 50. For example, the image signal may originate from a vehicle information system that generates information regarding the vehicle's speed, or the image signal may originate from a navigation system that generates information regarding turn-by-turn navigation instructions. The image signal may also originate from a mobile device in communication with the vehicle such that the information generated by the HUD includes mobile device information (e.g., identifying a person calling the mobile device of the driver). The image signal may originate from various systems, and generally indicates the information desired to be converted into the virtual image. The GPU 60, in turn, controls the other controllers 62 to 66 to create the virtual image. In embodiments, the laser controller 62 is configured to change emission intensity of the laser light sources 22a to 22c according to a control signal from the GPU 60. The mirror controller 64 is configured to drive the mirror 26 by sending appropriate commands to the scanner 25 which controls rotation of the mirror 26. The screen controller 66 is configured to drive the screen 24 such that it shifts position in the X-Y plane, as will be further described below. For example, in an embodiment, the screen controller 66 sends a signal to a driving unit 27 that physically shifts the screen 24 in the X-Y plane. As will be described further below, the driving unit 27 may be a motor, an electromagnet mechanism, or other such device that can controllably shift the position of the connected screen 24 in the X-Y plane.

In this disclosure, the term "controller" may refer to, be part of, or include processor hardware (shared, dedicated, or group) that executes code and memory hardware (shared, dedicated, or group) that stores code executed by the processor hardware. The code is configured to provide the features of the controller and systems described herein. In one example, the controller may include a processor, memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the programs may be configured, upon execution by the processor, to cause activation of the light sources 22a to 22c, movement of the mirror 26, and/or shifting of the screen 24, for example.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

Figure 3:
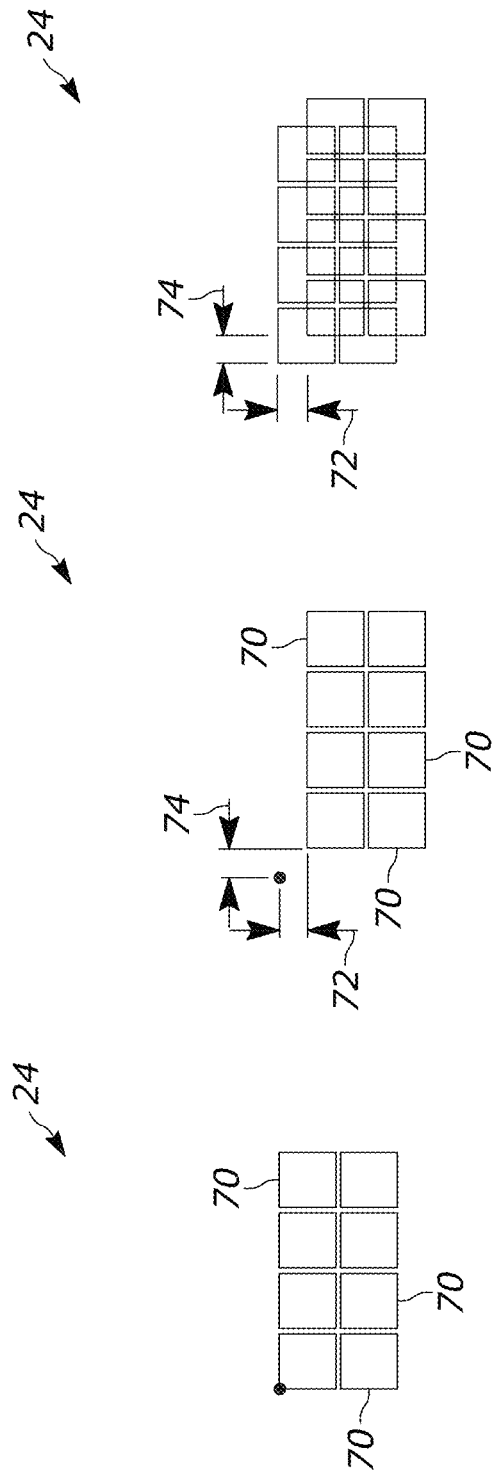
FIGS. 3A-3C are schematic illustrations of one embodiment of controllably shifting the screen of a scanning optics subsystem, according to an embodiment.

FIGS. 3A-3C are schematic illustrations controllably shifting of the screen 24, according to an embodiment. Here, the screen 24 is a microlens array having a plurality of lenses 70. Only eight lenses are shown in this view, but it should be understand that hundreds or thousands of lenses may be present in the microlens array. The lenses 70 are distributed along a surface extending in the X-Y plane of FIG. 2. In FIG. 3A, the microlens array is in a first location. In FIG. 3B, the screen controller 66 has caused the microlens array to shift in the X-Y plane to a second location. In doing so, each lens 70 has shifted a vertical distance 72 (along the Y-axis) and a horizontal distance 74 (along the X-axis). In other embodiments, the microlens array shifts in only one of the two directions.

FIG. 3C shows an overlay of the first location relative to the second location. The screen controller 66 can be programmed to shift the microlens array between the first position and the second position, back and forth. As shown, the vertical shift distance 72 can be equal to one half of the width of one of the lenses 70. Likewise, the horizontal shift distance 74 can be equal to one half of the height of one of the lenses 70. In other embodiments, the shift distances 72, 74 can be less, such as one third or one half of the respective height and width of the lenses 70. Each distance can be set by the screen controller 66 (or GPU 60) such that screen 24 shifts in a controlled, discrete manner between a first discrete location in FIG. 3A to a second discrete location in FIG. 3B. The oscillation between the two locations is not random or left uncontrolled.

In one embodiment, the screen controller 66 commands the shifting of the screen 24 between the first and second locations based in coordination with the laser controller 62 such that light is not emitted from the light sources 22a to 22c during movement of the screen 24. For example, the laser controller 62 can command the light sources 22a to 22c to produce light while the screen 24 is in the first discrete location, then turn off to allow the screen 24 to move to the second discrete location, and then turn back on. This entire cycle can happen in the magnitude of milliseconds such that it is complete undetectable by the human eye. Instead, the human eye perceives a better resolution of the virtual image due to image data being provided in two locations simultaneously (as far as the human eye is concerned). This reduces pixelization and increases the perceived resolution, resulting in an improved appearance to the driver.

Figure 4:
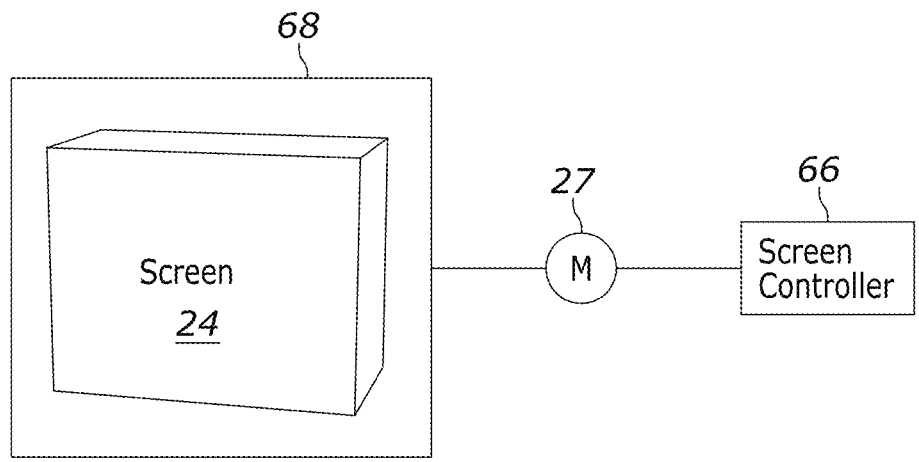
FIG. 4 is a schematic illustration of one embodiment of controlling the screen movement in which a motor is controlled to move a frame surrounding the screen.

FIG. 4 illustrates one schematic example of a driving unit 27 for performing the discrete shifting of the screen 24. In this example, the driving unit 27 is a motor which is connected (directly or indirectly) to a frame 68 such that movement of the motor causes shifting of the frame 68 in the horizontal and/or vertical direction as shown in FIG. 3A-3C.

The motor is commanded to operate according to instructions from the screen controller 66. For example, when it is desired to shift the screen 24 from the first discrete location (e.g., FIG. 3A) to the second discrete location (e.g., FIG. 3B), the screen controller 66 commands the motor to energize and shift the frame 68 such that the screen 24 shifts.

Figure 5:
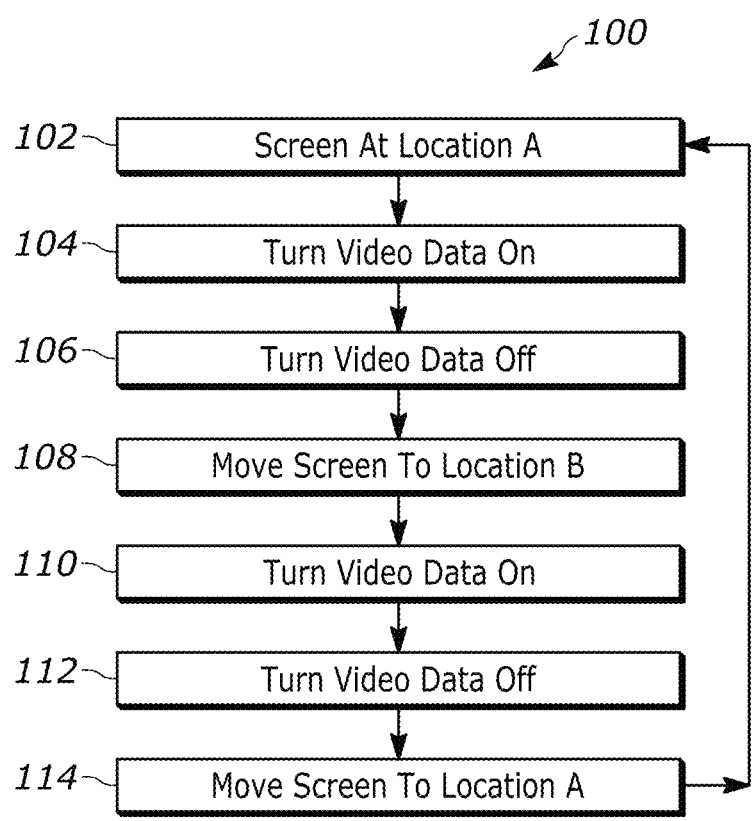
FIG. 5 is a method of generating a virtual image via a head-up display, according to an embodiment.

FIG. 5 illustrates a method 100 of generating the virtual image 50 via a head-up display (HUD) 10, according to an embodiment using the teachings disclosed herein. At 102, the screen is at the first discrete location, as shown in FIG. 3A. At 104, video data is generated. Said another way, the laser controller 62 activates the light sources 22a to 22c such that laser light is reflected off mirror 26 and scanned onto the screen 24. The light is scanned until a full frame of data is generated. Then at 106, the video data is off. Said another way, the laser controller 62 deactivates the light sources 22a to 22c such that no laser light is generated. While the video data is off, at 108 the screen controller 66 commands the screen 24 to move from the first discrete location to the second discrete location, as shown in FIG. 3B. Then, once the screen 24 is moved to the second discrete location, the video data is turned back on at 110. After another frame of the video data has been generated, the video data turns back off at 112. This allows the screen 24 to move back to the first discrete location at 114 via command from the screen controller 66 in between each frame of video data being generated. This process can repeat several times per second such that the human eye cannot perceive the movement.

Figure 6B:
FIG. 6B is an example of a virtual image generated by a second, improved head-up display utilizing the teachings disclosed herein, according to an embodiment.
Figure 6A:
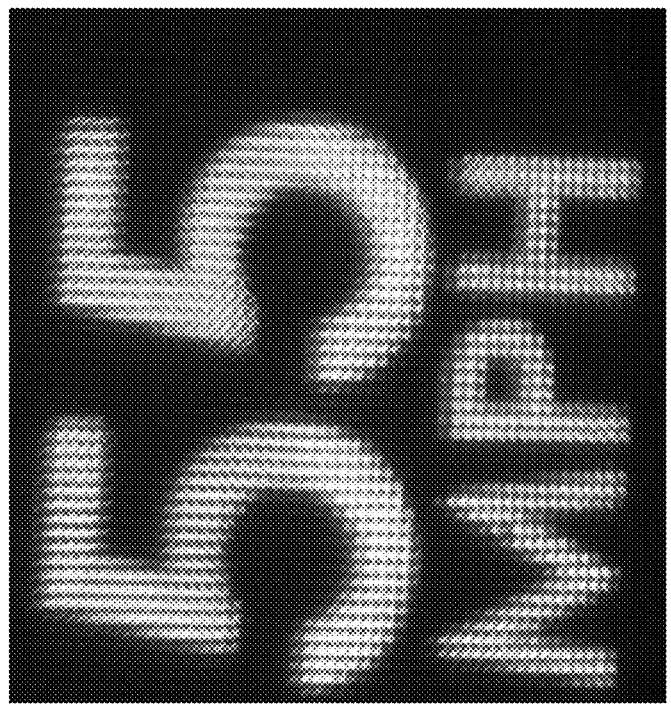
FIG. 6A is an example of a virtual image generated by a first head-up display.

FIG. 6A represents an illustration of a virtual image generated without the screen movement disclosed herein. FIG. 6B represents an illustration of the same virtual image, except with the screen movement. The resolution of the image in FIG. 6B is roughly double that of the image in FIG. 6A. Therefore, perceived pixelization is reduced, thus improving the appearance of the image for the driver.

Although this disclosure describes shifting of a screen in the environment of a head-up display, this disclosure should not be limited to such an environment. Instead, the disclosed concepts of screen shifting can be used augmented systems that utilize reality (AR), virtual reality (VR), mixed reality (MR) and/or extended reality (XR), such as headsets that use laser scanned in AR-VR-XR headsets that use laser scanning picture generation units (PGRs). Additionally, as a general image enhancement, the teachings provided herein can be used in any HUD or AR/VR/MR/XR headset that uses a microlens array as an intermediate image plane architecture.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A head-up display configured to allow an observer to visually recognize a virtual image, the head-up display comprising:
a laser light source configured to generate a laser light;
a mirror configured to rotate about an axis and scan the laser light;
a microlens array that receives the scanned laser light, the microlens array having a plurality of lenses extending along a plane, each lens having a width extending along a horizontal direction of the plane and a height extending along a vertical direction of the plane; and
at least one processor programmed to shift the microlens array by a discrete distance and in a discrete direction along the plane,
wherein the at least one processor is programmed to shift the microlens array in both the horizontal direction and the vertical direction,
wherein the laser light source generates the laser light on and off to produce a full frame image at a frame generation frequency, and wherein the at least one processor is programmed to shift the microlens array back and forth between a discrete first location and a discrete second location at a shift frequency associated with the frame generation frequency.

2. The head-up display of claim 1, wherein the at least one processor is programmed to shift the microlens array in the horizontal direction by a horizontal shift distance of one half of the width, and in the vertical direction by a vertical shift distance of one half of the height.

3. The head-up display of claim 1, wherein the at least one processor is programmed to shift the microlens array within the plane from the discrete first location to the discrete second location, and
wherein the discrete second location is offset from the discrete first location (a) along the horizontal direction by a horizontal shift distance, and (b) along the vertical direction by a vertical shift distance.

4. The head-up display of claim 3, wherein the at least one processor is programmed to shift the microlens array from the discrete second location back to the discrete first location.

5. The head-up display of claim 4, wherein the at least one processor is programmed to shift the microlens array from the discrete second location to the discrete first location in response to the laser light source not generating the laser light.

6. The head-up display of claim 5, wherein the shift frequency is equal to the frame generation frequency.

7. A head-up display configured to allow an observer to visually recognize a virtual image, the head-up display comprising:
a light source configured to selectively generate light;
a microlens array that receives the light, the microlens array having a plurality of lenses extending along a plane, each lens having a width extending along a horizontal direction of the plane and a height extending along a vertical direction of the plane; and
at least one processor programmed to shift the microlens array back and forth within the plane between a first discrete location and a second discrete location, wherein the first discrete location and the second discrete location are separated by (a) a horizontal shift distance less than or equal to one half of the width, and (b) a vertical shift distance less than or equal to one half of the height, and
wherein the at least one processor is programmed to shift the microlens array back and forth between the first discrete location and the second discrete location only when the light source is not generating light.

8. The head-up display of claim 7, wherein the light source is a laser light source, the head-up display further comprising:
a mirror configured to rotate about an axis and scan the laser light.

9. The head-up display of claim 7, wherein the light source generates frames of video data at a first frequency, and wherein the at least one processor is programmed to shift the microlens array back and forth at a second frequency corresponding to the first frequency.

10. The head-up display of claim 9, wherein the first frequency is twice the second frequency such that the light source generates two frames of video data for every single time the microlens array shifts from the first discrete location to the second discrete location and returns back to the first discrete location.

11. A method of generating a virtual image via a head-up display, the method comprising:
(a) positioning a microlens array at a first discrete location;
(b) generating video data by activating a laser light source to generate a laser light with the microlens array located in the first discrete location;
(c) terminating the video data by deactivating the laser light source with the microlens array located in the first discrete location;
(d) shifting the microlens array from the first discrete location to a second discrete location after (c) and while the video data is terminated;
(e) generating the video data by reactivating the laser light source with the microlens array located in the second discrete location;
(f) terminating the video data by deactivating the laser light source with the microlens array located in the second discrete location;
(g) shifting the microlens array from the second discrete location to the first discrete location after (f) and while the video data is terminated;
after (g), repeating (b)-(g); and
rotating a mirror about an axis to scan the laser light, wherein the mirror is rotated back and forth at a frequency that is faster than a frequency of (b)-(g) being repeated.

12. The method of claim 11, wherein the microlens array includes a plurality of lenses extending along a plane, and wherein (d) and (g) are performed along the plane.

13. The method of claim 12, wherein in (d), the microlens array is shifted from the first discrete location to the second discrete location by a horizontal shift distance and a vertical shift distance.

14. The method of claim 13, wherein the horizontal shift distance is less than or equal to one half of a width of one of the lenses.

15. The method of claim 14, wherein the vertical shift distance is less than or equal to one half of a height of one of the lenses.

* * * * *